United States Patent [19]

Gratzmuller

[11] Patent Number: 4,669,265

[45] Date of Patent: Jun. 2, 1987

[54] OLEOPNEUMATIC CONTROL SYSTEM FOR ELECTRIC CIRCUIT-BREAKERS

[76] Inventor: Claude A. Gratzmuller, 97 Avenue Victor Hugo, 75016 Paris, France

[21] Appl. No.: 614,792

[22] Filed: May 29, 1984

[30] Foreign Application Priority Data

May 30, 1983 [FR] France ............................... 83 08910

[51] Int. Cl.[4] ............................................ F16D 31/02

[52] U.S. Cl. ........................................ 60/416; 60/413; 91/461; 200/82 B

[58] Field of Search ............. 200/82 B, 148 R, 148 B; 60/413, 416, 418; 91/459, 461

[56] References Cited

U.S. PATENT DOCUMENTS

| | | | |
|---|---|---|---|
| 2,977,762 | 4/1961 | Dilworth | 60/416 |
| 3,969,985 | 7/1976 | Grieger et al. | 200/82 B |
| 4,204,461 | 5/1980 | Gratzmuller | 60/413 X |
| 4,213,020 | 7/1980 | Freeman | 200/82 B X |
| 4,463,818 | 8/1984 | Sonneborn | 60/413 X |
| 4,475,710 | 10/1984 | Leupers | 60/413 X |

FOREIGN PATENT DOCUMENTS 84825 10/1963 France .

OTHER PUBLICATIONS

Robert Bonnefille, *Techniques de l'Ingenieur,* "Electrotechnique", pp. D657-5 and D657-6.

*Primary Examiner*—Edward K. Look
*Attorney, Agent, or Firm*—Wegner & Bretschneider

[57] ABSTRACT

The times of response of a circuit-breaker control system to breaker-closing orders are reduced by means of a unit comprising a pressure reducer and a low-capacity compensating hydraulic accumulator, the unit being connected to the portions of the hydraulic control circuit which are alternately pressurized and depressurized. The hydraulic accumulator resupplies oil at reduced pressure to the portions of circuit in which there is a lack of oil or which are filled with emulsified oil as a result of depressurization operations.

14 Claims, 4 Drawing Figures

OLEOPNEUMATIC CONTROL SYSTEM FOR ELECTRIC CIRCUIT-BREAKERS

This invention relates to oleopneumatic control systems for electric circuit-breakers.

It is known that a control system of this type essentially comprises a hydraulic jack for actuating the moving contact of a circuit-breaker, one or a number of oleopneumatic accumulators which operate at a high pressure of the order of 200 to 400 bar, a jack-supplying and draining valve system which selectively connects the work chamber of the jack either to the accumulator or to a low-pressure drain tank, and a hydraulic circuit which transmits orders for initiating changeover of the above-mentioned valve system either to the supply position or to the drain-off position.

The hydraulic circuit for transmitting orders is selectively put under high pressure in order to bring the valve system of the jack to the supply position or in other words in order to bring the circuit-breaker to the closed position. Alternatively, the hydraulic circuit is selectively connected to the discharge in order to return the valve system of the jack to the drain-off position or in other words to bring the circuit-breaker back to the open or tripped position.

The order-transmitting hydraulic circuit is made dependent on a so-called operational control unit of well-known design which puts the order-transmitting hydraulic circuit under high pressure or connects it to the discharge on reception of transient breaker-closing or tripping orders in order to actuate two breaker-closing or tripping electrovalves.

The jack which actuates the moving contact of the circuit-breaker is restored to the position corresponding to tripping of the circuit-breaker by the resilient tripping means (mechanical or pneumatic spring). The jack is held in the position corresponding to closure of the circuit-breaker by maintaining the high pressure within the work chamber of the jack.

By way of example, an oleopneumatic control system of the type referred-to above is described and illustrated in the book entitled "Technique de l'Ingénieur" under the volume title "Electricité", page D 657-5. Further examples of control systems having the above features are shown in U.S. Pat. Nos. 3,969,985 and 4,204,461.

In accordance with well-known practice and as is apparent from the foregoing, a certain number of the fluid pipelines of a circuit-breaker control system (including the order-transmitting lines) are alternately subjected to the high pressure or else depressurized (drained substantially to atmospheric pressure).

Taking into account the high operating pressures employed (200 to 400 bar) at which the oil behaves as a compressible fluid as well as the very short operating times required for the circuit-breakers, the changeover of a pipeline from the "pressurized" condition to the "depressurized" condition gives rise to partial vacuum phenomena within certain volumes of oil by reason of the inertia of oil volumes which are set in motion at a high flow rate (several tens of meters per second) and which act in the same manner as a fluid piston.

The result thereby achieved is that, at least in certain portions, the pipes and in particular the order-transmitting pipe have volumes which either contain no oil at all or contain only emulsified oil.

For the following circuit-breaker closing operation which is carried out by repressurization of the pipe which has previously been drained, the pipe behaves as if it were partly filled with an elastic fluid and the time of response to the hydraulic pressurization signal is extended to an indefinite extent.

Over the past few years, circuit-breaker designs have shown a general trend toward increasingly short operating times of the order of a few milliseconds between the instant of transmission of the order and the start of actuation of the jack. An even more specific objective is the achievement of constant operating times which are reproducible in all cases of operation.

This is particularly important for the groups of circuit-breakers or circuit-breaker modules which have to be actuated simultaneously (circuit-breakers on the three phases of a network or circuit-breakers mounted in series on the same phase).

This is also important in the case known as "synchronous closing" in which the breaker-closing operation has to be carried out at a precise point of the voltage sine-wave, thus requiring a knowledge of the control response time.

In the event that a sufficient length of time elapses between a breaker-tripping operation and the following breaker-closing operation, there is sufficient time for more or less slow re-establishment of equilibrium within the order-transmission channels. In modern installations, however, it frequently happens that the time interval between transmission of a tripping order and transmission of the following breaker-closing order does not exceed a value of about 3/10 of a second. There then remain within the pipes at this moment volumes which contain no oil or which are filled with emulsified oil. In consequence, the response time can be at least doubled and response times can be very different between a number of circuit-breakers controlled by means of a single breaker-closing signal.

It is this defect in particular that the invention proposes to remove.

A further point worthy of note is that the harmful phenomena which were described earlier and appear within the pipes as a result of pressurization or depressurization operations are also liable to produce inleakages of air through seals which are oil-tight but not air-tight. In the case of a long period in the tripped position, these air inleakages have a detrimental effect on operating times and on the reproducibility of operating times of initial breaker-closing operations.

It should finally be pointed out that, as all the breaker-closing operations take place, the volumes of emulsified oil contained within the depressurized pipes are returned into the entire hydraulic control circuit in which they are liable to produce adverse effects such as, for example, large pressure waves or the impossibility of carrying out hydraulic sequences in series.

The present invention makes it possible to overcome the drawbacks just mentioned.

The invention is directed to an oleopneumatic control system of the aforementioned type which comprises in addition a pressure reducer for delivering a low pressure PR which is reduced from the high pressure HP of the accumulator, as well as a compensating reduced-pressure accumulator having a low capacity with respect to the capacity of the high-pressure accumulator HP which is recharged by the pressure reducer and connected to the order-transmitting hydraulic circuit of the oleopneumatic control system.

Preferably, the compensating accumulator is connected to the order-transmitting hydraulic circuit in the vicinity of the upstream end of a portion of said circuit as considered in the direction of flow of the oil within this portion of the circuit when said circuit undergoes a transition from the "pressurized" condition to the "depressurized" condition.

By virtue of this arrangement, the compensating accumulator directly resupplies with non-emulsified oil the specific locations of the circuit in which voids or oil emulsions appear, with the result that the "oil-filled" condition is restored practically instantaneously within the circuit which is ready to receive another breaker-closing signal.

In the common case of a hydraulic control system in which the high pressure delivered by the main accumulator is of the order of 200 to 400 bar, the pressure reducer and the compensating accumulator are set for a reduced pressure (low pressure) within the range of 2 to 10 bar, which is of the order of twenty to one hundred times lower than the pressure of the main accumulator.

Should the compensating accumulator be connected, in all operational configurations of the installation, to a portion of the hydraulic circuit which is intended to be connected to the high pressure, a non-return valve is placed upstream of the accumulator in order to prevent the high pressure from returning to this latter.

It has been mentioned in the foregoing that the compensating accumulator had a low capacity with respect to the main accumulator. By way of example, this capacity can be one hundred to one thousand times smaller. Thus the capacity of the compensating accumulator can be of the order of a few cubic centimeters to a few tens of cubic centimeters whereas the capacity of the main high-pressure accumulators is commonly of the order of a few cubic decimeters to a few tens of cubic decimeters.

It will be readily understood that a single compensating accumulator can be connected to several points of the circuit, namely to any points at which an emulsion is most liable to appear. Alternatively, a plurality of compensating accumulators can be provided in respect of a single control unit.

As is well known, oleopneumatic control systems for circuit-breakers are often provided with one or a plurality of hydraulic relay valves in the hydraulic circuit which connects the "operational unit" to the supply and drain valve system of the jack.

In one embodiment of the invention, the compensating accumulator can be connected not only to the pressure reducer in order to be recharged by this latter but also to one of the chambers of at least one of the relay valves which receive the drain-off oil from the order-transmitting duct when this latter is "depressurized", with the result that the compensating accumulator is also partially recharged by the drain-off oil which is discharged at the time of breaker-closing operations.

The compensating reduced-pressure accumulator is preferably a low-inertia accumulator having a predetermined response time for delivery of the compensation oil. Preferably, the compensating accumulator is of the diaphragm type having a short range of travel, the diaphragms being subjected to the action of a mechanical spring by means of a bearing plate.

Other features of the invention will be more apparent to those skilled in the art upon consideration of the following description and accompanying drawings, wherein:

FIG. 1 a diagrammatic representation of an oleopneumatic control system for a circuit-breaker equipped with a compensating system in accordance with the invention.

Figure 1:
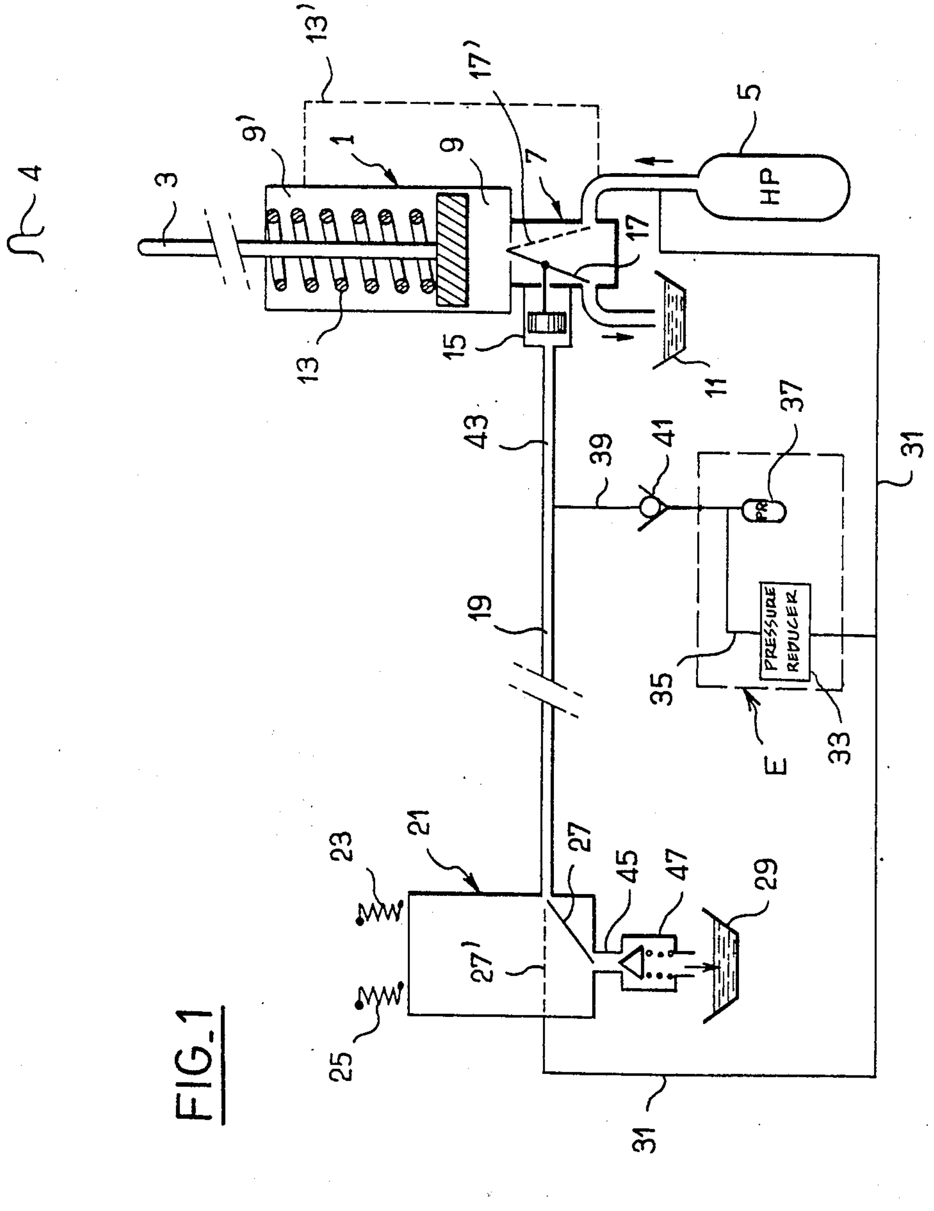

There are shown in FIG. 1 the essential elements of an oleopneumatic control system of known type for electric circuit-breakers. This control system comprises a hydraulic jack 1 for actuating the moving contact 3 of a circuit-breaker and displacing said contact toward the stationary contact 4, a main high-pressure oleopneumatic accumulator 5, a supply and drain valve system 7 for selectively connecting the work chamber 9 of the jack 1 either to a low-pressure tank 11 in the open position of the circuit-breaker shown in FIG. 1 or to the accumulator 5 for moving the circuit-breaker to the closed position and maintaining it in this position. The jack is returned to the tripped position by permanent resilient means such as a spring 13 or the resilient pressure of the accumulator 5 which is introduced into the upper chamber 9' of the jack via a pipeline 13' represented in FIG. 1 by a dashed line. The supplying and draining system 7 comprises a hydraulic actuator 15 for the supply and drain valve which moves the switching member 17 of the valve to the supply position 17' when it is subjected to the hydraulic high pressure introduced via a pipe 19 and restores the switching member 17 to the drain-off position (represented by a full line) when said actuator is no longer subjected to the high pressure. Finally, the installation is provided in accordance with conventional practice with an order-transmitting station 21 or so-called "operational unit" which can be located at a distance from the circuit-breaker and comprises a breaker-closing electrovalve 23 and a breaker-tripping electrovalve 25 which initiate switching of a valve 27. In the full-line position of the valve 27 shown in FIG. 1, the pipe 19 which provides a connection between the operational unit and the valve system 7 is connected to a low-pressure tank 29. In the dashed-line position 27', said pipe 19 is connected to the high pressure delivered either by an additional accumulator provided in the operational unit or by the main accumulator 5 which is connected to the operational unit by means of a pipeline 31.

The operation of an installation of this type is well-known and it need only be recalled that, in the case illustrated in FIG. 1, the sole function of the pipe 19 (which can be of substantial length) is to transmit orders by "pressurization" or "depressurization" whereas the high-flow-rate hydraulic power required for supply of the jack 1 is supplied directly by the main accumulator 5.

In order to move the circuit-breaker to the closed position and to maintain it in this position, the pipe 19 is put under the high pressure of the main accumulator 5. By way of example, this pressure can be within the range of 200 to 400 bar. In order to move the circuit-breaker to the tripped position, the pipe 19 is connected to the discharge substantially at atmospheric pressure. During this operation, the oil contained in the pipe 19 undergoes a pressure drop as explained earlier and at least a portion of said pipe no longer contains any oil or else is filled with emulsified oil.

If the following breaker-closing order is given after a short period of time by restoring pressure within the pipe 19, this pipe will behave as if it were filled with an elastic fluid, with the result that the response time of the actuator 15 will be considerably increased and will be variable from one operation to another.

In accordance with the invention, provision is made for a "compensating pressure-reducer/accumulator" unit E comprising a pressure reducer 33, the high-pressure side of which is connected to the main accumulator 5 through the line 31 and which delivers a reduced pressure PR via its outlet 35. The unit E further comprises a low-capacity compensating reduced-pressure accumulator 37 which is recharged with oil at the low pressure PR by the pressure reducer and which is connected to the order-transmitting hydraulic circuit 19 by means of a pipe 39.

A non-return valve 41 mounted in the pipe 39 prevents the high pressure which is present within the pipe 19 in the closed position of the circuit-breaker from reaching the low-pressure section PR of the hydraulic circuit 33, 35, 37.

Preferably, the pipe 39 is connected to the pipe 19 in the vicinity of the end portion 43 located upstream if consideration is given to the flow of oil when the circuit 19 undergoes a transition from the "pressurized" condition to the "depressurized" condition and taking into account the fact that said end portion 43 is the most exposed to the hazardous phenomenon of oil shortage.

By virtue of the unit E, the pipe 19 which has been partly emptied of oil (or filled with emulsified oil) at the time of pressurization is rapidly resupplied and refilled with oil in the liquid state at the pressure PR by means of the compensating accumulator 37 which is immediately recharged with oil by the pressure reducer 33.

In order to prevent continuous discharge of the compensating accumulator 37 and the pressure reducer 33 in the closed position of the circuit-breaker, provision is made in the discharge duct 45 of the operational unit 21 for a check valve 47 which is calibrated at a slightly higher pressure than the pressure PR.

It will be readily apparent that a plurality of identical units E can be provided for resupplying a number of different points of the hydraulic circuit which are the most liable to be subjected to deficient oil flow or to the presence of emulsified oil. By means of a single unit E, it is also possible to resupply a number of different points of the hydraulic circuit.

The volume of the portions of the hydraulic circuit which are emptied of oil at the moment of pressurization is relatively small. For this reason, it is only necessary to provide a compensating accumulator 37 having a low capacity, for example within the range of a few cubic centimeters to a few tens of cubic centimeters (namely of the order of one thousand times less than the capacity of the main accumulator 5).

It has further been observed that a "reduced pressure" of low value need only be produced in order to resupply the portions which contain no oil. Thus in the case of the compensating accumulator 37 and in the case of the pressure reducer 33, it is sufficient to provide a reduced pressure of the order of 2 to 10 bar whereas the high pressure of the accumulator 5 is of the order of 200 to 400 bar.

Finally, it is an advantage to ensure that the compensating accumulator 37 has low inertia in order to provide rapid compensation for oil shortages. As will become apparent from FIG. 4, it is for this reason that preference will be given to the choice of a diaphragm accumulator having a short range of travel. The diaphragm of said accumulator is acted upon by a mechanical spring applied against the diaphragm by means of a bearing plate.

Figure 2:
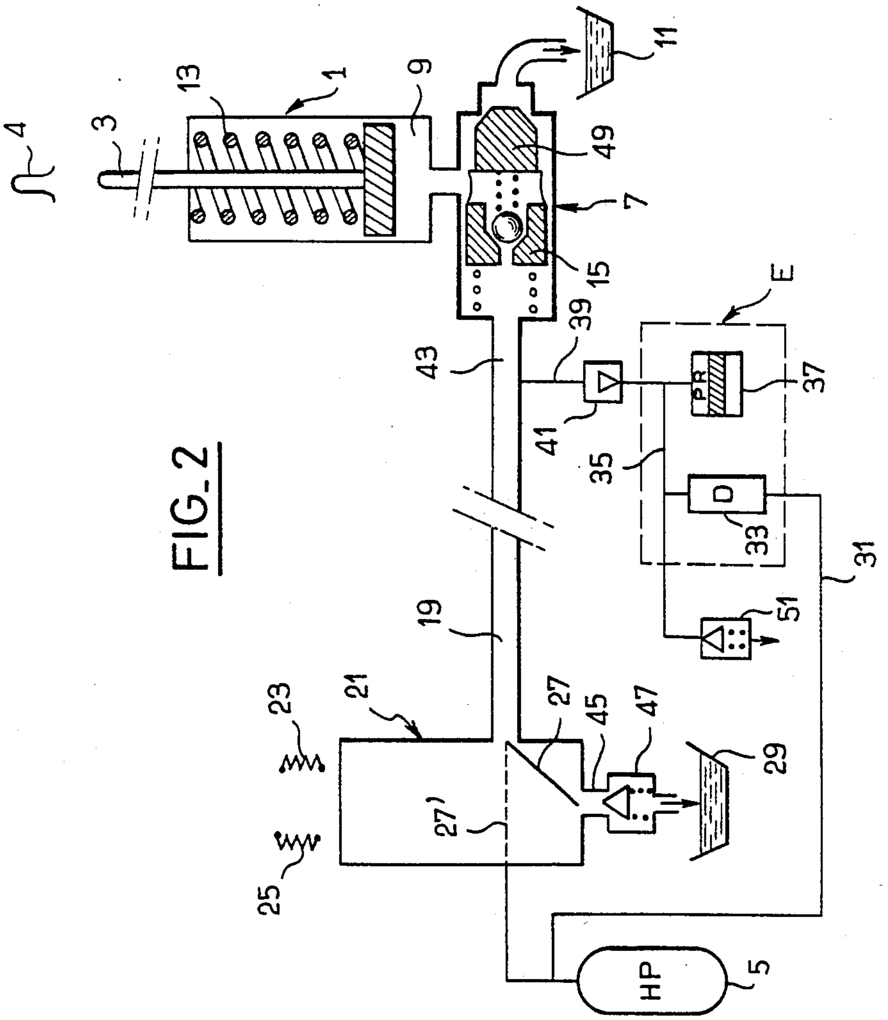
FIG. 2 is a variant of FIG. 1 in which the connecting pipe between the control unit and the jack of the circuit-breaker is employed both for transmission of hydraulic orders and for transmission of power.

There is shown in FIG. 2 another known system of hydropneumatic control for circuit-breakers in which provision is made for the same essential elements as the system shown in FIG. 1. In this system, however, the connecting pipe 19 between the operational unit 21 and the supply and drain valve 7 of the jack 1 is not only a duct for the transmission of orders to the valve 7 (by "pressurization" or "depressurization") but also serves as a power duct for supplying the work chamber 9 of the jack 1.

In the case of the valve 7, there is shown by way of example a so-called "rapid drain valve" of known design in which the portion 15 of the drain valve 49 which forms a piston constitutes the hydraulic actuator of the valve 7.

The unit E comprising the pressure reducer 33 and the compensating accumulator 37 at the reduced pressure PR is identical with the accumulator described earlier with reference to FIG. 1 and is preferably connected to the pipe 19 by means of a pipe 39 which opens into the upstream region 43 of the pipe 19.

Provision can be made in addition for a safety valve 51 connected to the portion of hydraulic circuit 35 which is at the pressure PR. This safety valve is calibrated at a pressure which is slightly higher than the value PR and serves to protect the unit E against any abnormal overpressure such as may occur, for example, in the event of leakage of the non-return valve 41.

It is well-known that, in hydraulic control circuits for circuit-breakers, the final supply and drain valves of the jack or jacks which have large cross-sectional areas are not controlled directly (as shown only for the sake of enhanced simplicity in FIGS. 1 and 2) but by means of a plurality of pilot valves and relay valves having increasing cross-sectional areas.

These pilot valves and relay valves form part of the order-transmitting hydraulic circuit and at least a number of the valve chambers are also subjected to circulations of emulsified oil or oil voids. As in the case of the pipes described in connection with FIGS. 1 and 2, the appearance of oil shortages or of emulsified oil occurs in certain portions of these relay valves or pilot valves and within the pipes with which these latter communicate, thus having a detrimental effect on the speed of response at the moment of repressurization.

It is therefore an advantage to resupply at least a certain number of the chambers of these valves with oil at reduced pressure.

Figure 3:
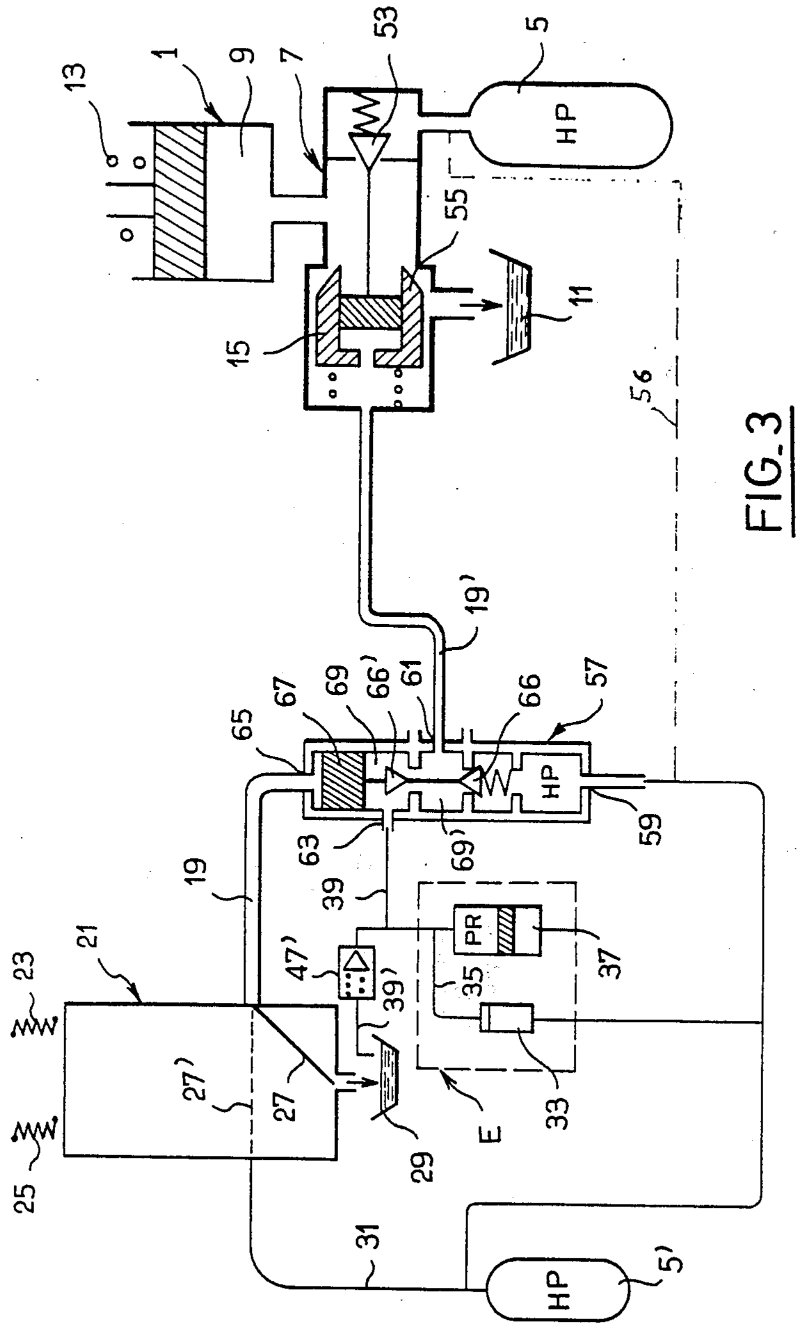
FIG. 3 is another variant of FIG. 1 in which the compensatihg system in accordance with the invention resupplies the relay valves of the hydraulic circuit.

There are shown in FIG. 3 the essential elements of a conventional oleopneumatic control system which is similar to the system shown in FIG. 1 insofar as the connecting pipe 19—19' between the operational unit 21 and the supply and drain valve 7 of the jack 1 is only an order-transmitting pipe ("pressurized" or "depressurized"). Supply of the jack 1 at a high flow rate is produced by the main accumulator 5. The supply and drain valve 7 shown in the figure is a conventional valve comprising a supply closure member 53 and a discharge closure member 55 which are independent, the hydraulic actuator 15 of the valve being constituted by the portion of the discharge closure member 55 in the form of a piston.

There is also shown an auxiliary high-pressure accumulator 5' which supplies the operational unit 21, these two accumulators being connected in pressure equilibrium by means of a low-flow-rate duct 56 (shown in dashed lines in FIG. 3) and being recharged in the conventional manner by a pump which is not shown in the figure.

A control system of this type is provided in the conventional manner with relay valves, only one of which is illustrated in the figure and designated by the reference numeral 57.

It need only be recalled that said relay valve comprises a high-pressure inlet 59, a high-pressure outlet 61 joined to the connecting pipe 19', a discharge outlet 63 and a control inlet 65 joined to the connecting pipe 19 with the operational unit 21. The supply closure members 66 and discharge closure members 66' of the valve 57 are controlled by a pilot jack 67.

The unit E comprising the pressure reducer 33 and the compensating reduced-pressure accumulator 37 is connected to the drain-off chamber 69 of the relay valve 57 by means of a pipe 39. When receiving an order for actuating the electrovalve 25, the supply and drain valve of the operational unit 21 comes into the drain-off or discharge position 27 represented by a full line. Since the pilot jack 67 is no longer under pressure, the discharge closure member 66' opens and connects the chambers 69—69' to the drain tank. Decompression and circulation of oil within these chambers produces the phenomena of lack of oil (oil shortage) and of oil emulsion mentioned earlier in the description. The unit E immediately and directly resupplies the chambers of the relay valve and the pipe 19' with oil at the pressure PR, thus making it possible to ensure a normal time of response to the next breaker-closing order.

A check valve 47' (similar to the check valve 47 of FIGS. 1 and 2) which is calibrated for a higher pressure than the value PR is provided in the drain-off pipe 39' which is joined to the connecting pipe 39 between the unit E and the chamber of the relay valve 57.

As shown in FIG. 3, the chamber 69 is never subjected to the high pressure since the valve closure member 66' is closed and isolates the chamber 69 in the closed position of the circuit-breaker. It is for this reason that, in this embodiment, the pipe 39 is not provided with a non-return valve similar in design to the valve 41 of FIGS. 1 and 2.

The advantage of this arrangement is that the compensating reduced-pressure accumulator 37 is not only recharged by the pressure reducer 33 but also partially recharged by the drain-off oil derived from decompression of the pipe 19' at each breaker-tripping operation.

It will be readily apparent that, if one or a number of additional relay valves are provided, for example within the operational unit 21 instead of the simple supply and drain valve 27—27' which is illustrated diagrammatically, the chambers of these relay valves which are equivalent to the chamber 69 can also be resupplied with oil at the pressure PR by another compensating unit E or by the unit E shown in FIG. 3.

It is worthy of note that the compensating unit E in accordance with the invention is also operative throughout the long stationary periods in the tripped position during which any possibility of admission of air is prevented by the supply of oil at reduced pressure PR from the compensating unit E. It is thus ensured that the response times will be maintained as soon as the first breaker-closing operation takes place.

Figure 4:
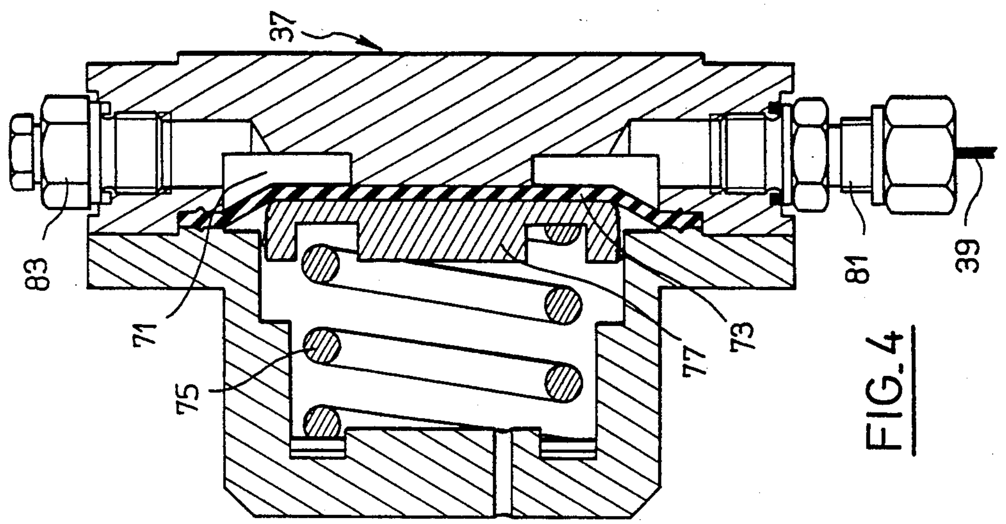
FIG. 4 is a sectional view of a spring-actuated compensating accumulator of the diaphragm type.

FIG. 4 shows one form of construction of the low-capacity compensating accumulator 37 having a reduced pressure PR. The accumulator comprises a variable-volume oil storage chamber 71 which is closed by a leak-tight diaphragm 73 controlled by a spring 75 with interposition of a bearing plate 77. A coupling 81 which opens into the chamber 71 is joined to the connecting pipe 39 (shown in FIGS. 1, 2, 3). Provision is also made for an air cock 83 for bleeding air at the time of initial filling. An accumulator of this type has low inertia, the total range of travel of the diaphragm 73 being 5 to 10 mm, for example, in respect of a diaphragm area of 20 to 40 square centimeters, which corresponds to a capacity of approximately 10 to 40 cubic centimeters. By virtue of this low inertia, compensation of oil voids or volumes filled with emulsified oil is very rapid.

What is claimed is:

1. An oleopneumatic control system for an electric circuit-breaker which comprises a jack for actuating the moving contact of the circuit-breaker, a main high-pressure oleopneumatic accumulator, a valve system which has the function of supplying and draining the jack and selectively connects the work chamber of the jack either to the accumulator or to a low-pressure tank, means for restoring the jack to the tripped position of the circuit-breaker, an order-transmitting hydraulic circuit comprising at least one pressure-responsive hydraulic actuator which moves said valve system to the supply position when said actuator is subjected to the high pressure and moves said valve system to the discharge position when said actuator is no longer subjected to the high pressure, an order-transmitting operational unit, a circuit providing a connection between the operational unit and said valve system, and a pressure reducer connected to the order-transmitting hydraulic circuit, the function of said pressure reducer being to deliver a low pressure PR reduced from the high pressure of the accumulator, wherein said control system comprises at least one compensating reduced-pressure accumulator having a small capacity with respect to the capacity of the main accumulator which is recharged at said pressure PR by said pressure reducer and which is connected by means of a pipe to said order-transmitting hydraulic circuit.

2. A control system according to claim 1, wherein the capacity of the compensating accumulator is of the order of one hundred to one thousand times smaller than the capacity of the main accumulator.

3. A control system according to claim 1, wherein a non-return valve is interposed in the pipe which connects the compensating accumulator to the order-transmitting hydraulic circuit, said non-return valve being intended to permit only the flow of oil from the compensating accumulator to the order-transmitting circuit.

4. A control system according to claim 1, wherein a check valve calibrated for a pressure of slightly higher value than the reduced pressure PR is interposed in the drain circuit of said control system.

5. A control system according to claim 1, wherein the pipe which connects the compensating accumulator to the order-transmitting hydraulic circuit terminates in said circuit in the vicinity of its upstream end as considered in the direction of flow of oil within the circuit when said circuit undergoes a transition from the "pressurized" condition to the "depressurized" condition.

6. A control system according to claim 1, wherein the order-transmitting circuit also constitutes the circuit for supplying oil under high pressure to the jack.

7. An oleopneumatic control system according to claim 1, wherein said system comprises at least one hydraulic relay valve interposed in the order-transmitting circuit and wherein the compensating accumulator is not only connected to the pressure reducer in order to be recharged by said pressure reducer but is also connected to a chamber of at least one of said hydraulic relay valves, said chamber being intended to receive the drain-off oil derived from the order-transmitting pipe when said pipe is "depressurized".

8. An oleopneumatic control system for an electric circuit-breaker which comprises a jack for actuating the moving contact of the circuit-breaker, a main high-pressure oleopneumatic accumulator, a valve system which has the function of supplying and draining the jack and selectively connects the work chamber of the jack either to the accumulator or to a low-pressure tank, means for restoring the jack to the tripped position of the circuit-breaker, an order-transmitting hydraulic circuit comprising at least one pressure-responsive hydraulic actuator which moves said valve system to the supply position when said actuator is subjected to the high pressure and moves said valve system to the discharge position when said actuator is no longer subjected to the high pressure, an order-transmitting operational unit, a circuit providing a connection between the operational unit and said valve system, and a pressure reducer connected to the order-transmitting hydraulic circuit, the function of said pressure reducer being to deliver a low pressure PR reduced from the high pressure of the accumulator, wherein said control system comprises at least one compensating reduced-pressure accumulator having a small capacity with respect to the capacity of the main accumulator which is recharged at said pressure PR by said pressure reducer and connected by means of a pipe to said order-transmitting hydraulic circuit, said compensating reduced-pressure accumulator being a low-inertia accumulator comprising a diaphragm which delimits the oil chamber, the diaphragm being controlled by a mechanical spring which actuates said diaphragm by means of a bearing plate, wherein the distance which the mechanical spring displaces the diaphragm is less than one-sixth of the diameter of the diaphragm.

9. A control system according to claim 8, wherein the capacity of the compensating accumulator is of the order of one hundred to one thousand times smaller than the capacity of the main accumulator.

10. A control system according to claim 8, wherein a non-return valve is interposed in the pipe which connects the compensating accumulator to the order-transmitting hydraulic circuit, said non-return valve being intended to permit only the flow of oil from the compensating accumulator to the order-transmitting circuit.

11. A control system according to claim 8, wherein a check valve calibrated for a pressure of slightly higher value than the reduce pressure PR is interposed in the drain circuit of said control system.

12. A control system according to claim 8, wherein the pipe which connects the compensating accumulator to the order-transmitting hydraulic circuit terminates in said circuit in the vicinity of its upstream end as considered in the direction of flow of oil within the circuit when said circuit undergoes a transition from the "pressurized" condition to the "depressurized" condition.

13. A control system according to claim 8, wherein the order-transmitting circuit also constitutes the circuit for supplying oil under high pressure to the jack.

14. A control system according to claim 8, wherein said system comprises at least one hydraulic relay valve interposed in the order-transmitting circuit and wherein the compensating accumulator is not only connected to the pressure reducer in order to be recharged by said pressure reducer but is also connected to a chamber of at least one of said hydraulic relay valves, said chamber being intended to receive the drain-off oil derived from the order-transmitting pipe when said pipe is "depressurized".

* * * * *